(12) United States Patent
Sivinski

(10) Patent No.: US 12,185,660 B2
(45) Date of Patent: Jan. 7, 2025

(54) ADJUSTABLE DEPTH CONTROL SYSTEM FOR ROW UNIT PLANTERS

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 969 days.

(21) Appl. No.: 17/249,822

(22) Filed: Mar. 15, 2021

(65) Prior Publication Data

US 2021/0289688 A1 Sep. 23, 2021

Related U.S. Application Data

(60) Provisional application No. 62/990,710, filed on Mar. 17, 2020.

(51) Int. Cl.
*A01C 7/20* (2006.01)
*A01C 7/08* (2006.01)

(52) U.S. Cl.
CPC . *A01C 7/20* (2013.01); *A01C 7/08* (2013.01)

(58) Field of Classification Search
CPC .............. A01C 7/20; A01C 7/08; A01C 7/203
See application file for complete search history.

(56) References Cited

U.S. PATENT DOCUMENTS

| | | | | |
|---|---|---|---|---|
| 3,700,043 A * | 10/1972 | Sullivan | ................. | A01B 63/16 172/485 |
| 3,749,035 A * | 7/1973 | Cayton | ................. | A01C 7/205 111/926 |
| 4,594,951 A * | 6/1986 | Grataloup | .............. | A01C 5/062 172/395 |
| 5,555,825 A * | 9/1996 | Geddes | ................. | A01C 7/201 172/551 |
| 5,868,207 A * | 2/1999 | Langbakk | .............. | A01C 7/201 172/321 |
| 5,934,208 A * | 8/1999 | Clemons | ................ | A01C 7/203 111/164 |
| 6,325,156 B1 * | 12/2001 | Barry | .................... | A01C 5/068 111/135 |

(Continued)

FOREIGN PATENT DOCUMENTS

EP 1212932 A1 * 6/2002 ............ A01B 49/06

*Primary Examiner* — Jamie L McGowan
(74) *Attorney, Agent, or Firm* — McKee, Voorhees & Sease, PLC

(57) ABSTRACT

A row planter having a pair of gauge wheels mounted on gauge wheel arms includes a controller for adjusting the position of the gauge wheels, and thereby adjusting the planting depth of seeds. The controller is pivotally mounted on the row unit, with a handle on the upper end and a rocker arm on the lower end engaging the gauge wheel arms. The controller can be pivoted about a transverse horizontal axis by movement of the handle so as to adjust the rocker arms, and thereby the gauge wheels arms for adjusting the seed planting depth. The controller further includes a pivotal block to which the rocker arm is mounted. The pivotal block can be adjusted via bolts on opposite forward and rearward sides of the block, so as to fine-tune the rocker arm position, and thereby further adjust the planting depth of the row unit.

19 Claims, 24 Drawing Sheets

(56) References Cited

U.S. PATENT DOCUMENTS

| | | | | |
|---|---|---|---|---|
| 6,945,182 B1* | 9/2005 | Haukaas | ................ | A01B 49/06 |
| | | | | 111/195 |
| 9,723,778 B2* | 8/2017 | Bassett | ................... | A01C 5/06 |
| 2010/0180695 A1* | 7/2010 | Sauder | ................ | A01B 63/008 |
| | | | | 73/862.045 |
| 2011/0005439 A1* | 1/2011 | Patwardhan | ........... | A01C 5/064 |
| | | | | 111/149 |
| 2013/0118391 A1* | 5/2013 | Gadzella | .............. | A01B 61/046 |
| | | | | 111/163 |
| 2017/0300072 A1* | 10/2017 | Bassett | ................... | A01C 7/205 |
| 2018/0116098 A1* | 5/2018 | Bassett | ................... | A01C 5/062 |
| 2019/0000004 A1* | 1/2019 | Sloneker | ................ | F16H 19/04 |
| 2019/0110388 A1* | 4/2019 | Gresch | .................... | A01C 7/20 |
| 2019/0216005 A1* | 7/2019 | Bassett | ................ | A01B 79/005 |
| 2020/0281112 A1* | 9/2020 | Salowitz | ................ | A01C 7/203 |
| 2021/0289688 A1* | 9/2021 | Sivinski | ................ | A01C 7/203 |

* cited by examiner

ADJUSTABLE DEPTH CONTROL SYSTEM FOR ROW UNIT PLANTERS

CROSS-REFERENCE TO RELATED APPLICATIONS

This application claims priority to U.S. Provisional Application Ser. No. 62/990,710, filed on Mar. 17, 2020, which is herein incorporated by reference in its entirety.

FIELD OF THE INVENTION

The invention relates to row planters for planting seeds in a field, and particularly the means and method for adjustably controlling the planting depth of the row unit.

BACKGROUND OF THE INVENTIONS

Accuracy of seed planting depth of agricultural seed is ever increasing, due to a developing understanding, that uniform seed emergence from the soil, can directly affect the yield of that crop. Additionally, new high-tech seeds have increase ability to improve yield if planted correctly.

Seed planting row units all contain systems for controlling the planting depth of seeds in the soil. These systems consist of threaded adjusters, lever arm adjusters and/or expensive automated adjusters. All of these types of depth control systems control the planter row unit gauge wheel arms, which then control planter row unit planting depth. Most modern row units utilize a gauge wheel arm rocker/equalizer arm, of various designs, that allows the left and right gauge wheel arms for each gauge wheel to "walk" over uneven ground and average out the planting depth of the row unit as it travels through the field.

One of the problems with all types of depth control systems is that the accuracy of planting depth can vary from row unit to row unit, on the row crop planter, causing inconsistent planting depth across the planter, and thus inconsistent plant emergence and yield. This planting inaccuracy can be caused by manufacturing tolerances, and/or component part wear of the depth control system and of the seed trench opener system components, such as disc openers and opener shoes.

Typical lever arm depth control systems utilize "notches" as a guide to determine the planting depth of all the row units on the planter. With "notch" planter systems, farmers typically set all the row units in the same notches to set planting depth, which can cause inaccurate planting depth from row to row, because of component wear or manufacturing tolerances.

To determine "actual" planting depth of each row unit, seed must be uncovered in the seed trench and seed depth measured, for each planter row unit. On large modern planters there can be as many as 48 rows (or more), so that measuring can require many hours to complete.

Most planter row units have fixed depth control gauges on the row unit to give the farmer a guide for setting the planting depth. After the actual planting depth has been determined, by uncovering seed, and actual validation that the planter is planting at the correct depth, the planter row unit depth control system gauges may all be set at different depths across the planter. On large planters this can be very difficult to manage throughout the planting season as the planter is adjusted to various planting depths for varying soil conditions and for different crops.

Current versions of the non-adjustable depth control system require the steel rocker/equalizer arm to pivot on a steel pivot/rocker retain shoulder bolt. The rocker/equalizer pivot retain bolt, is a specialized bolt, which is more expensive than a standard bolt. Because there is steel on steel oscillation action between the rocker/equalizer arm and the pivot/rocker pivot retain shoulder bolt, component wear between the components will occur soon after the planter begins operation. Because of the extreme, dusty/dirty environment that this system operates in and due to the remote location of these components, lubrication of these parts is difficult and would be extremely time consuming. Non-grease type components have been found to attract dust and develop a compacted dust layer between the components which will eventually build up to a level that causes the components to stop oscillating and not work properly. Research for a self-lubricating bushing that will work in this environment is ongoing and could replace the softer steel bushing in the future.

Wear of the steel rocker/equalizer arm and pivot/rocker pivot retain shoulder bolt, causes the planter row unit to plant at various planting depths. Replacement of these expensive components is required frequently to maintain planting depth accuracy.

FIGS. 1-3A show a conventional, non-adjustable depth controller 10 for a row planter. As best seen in FIGS. 3 and 3A, this depth controller 10 includes a one-piece arm 12 with a handle 14 extending into the upper end of the arm 12 and retained by a spring 16 and a snap ring 18. The arm 12 is pivotally mounted to the row unit by a pin 20 extending through opposite side plates 22 on the row planter frame and through a horizontally disposed hole 24 in the lower end of the arm 12. The pivot pin 20 is retained by a cotter pin 26. A bolt 28 pivotally mounts in equalizer or rocker arm 30 to the lower end of the control arm 12. A shim washer 34 may also be used with the bolt 28. The opposite wings 36 of the equalizer/rocker arm 30 engaged the gauge wheel arms 38 on each side of the row planter. The handle 14 can be selectively moved to one of a plurality of notches 40 in the upper plate 42 of the row planter frame. The handle 14 includes opposite pegs or pins 44 for receipt in the notches 40. The pegs 44 can be disengaged from the notches 40 by pulling up on the handle 14 against the bias of the spring 16, and then the arm 12 pivoted about the pin 20. The position of the gauge wheel arms 38, and thus the gauge wheels, can be raised or lowered by moving the handle 14 downwardly/rearwardly or upwardly/forwardly, respectively, along the notches 40. Over time, the rocker arm wings 36 tend to wear from travel through the field, thus changing the planting depth from the predetermined, desired depth. The nonadjustable controller 10 cannot accommodate such changes due to normal wear. Also, manufacturing tolerances, which provide variances in the planting depths across the row units, cannot be accommodated by the non-adjustable controller 10.

Therefore, there is a need for an improved, adjustable controller to maintain accuracy in planting depths of the row units.

Therefore, a primary objective of the present invention is the provision of an adjustable depth controller for an agricultural row unit for improved precision planting.

Another objective of the present invention is the provision of an adjustable depth controller for row unit planters which accommodates manufacturing tolerances and component wear.

Still another objective of the present invention is the provision of an adjustable depth controller for row planters which can be retrofit onto existing row planters.

Yet another objective of the present invention is the provision of a means of minimizing component wear in a depth controller and minimizing costs associated with such wear.

A further objective of the present invention is the provision of an adjustable depth controller to fine tune the position of the gauge wheel support arms.

Another objective of the present invention is the provision of a device for longitudinal pivoting of the gauge wheel rocker arm.

Still another objective of the present invention is the provision of a method of adjusting the position of the rocker arm for the gauge wheel support arms on the planter.

A further objective of the present invention is the provision of a method of adjusting planting depth by pivoting the rocker arm of the gauge wheels about a transverse horizontal axis, in addition to pivotal movement of the gauge wheel depth controller on the same transverse, horizontal axis.

These and/or other objects, features, and advantages of the disclosure will be apparent to those skilled in the art. The present invention is not to be limited to or by these objects, features and advantages. No single embodiment need provide each and every object, feature, or advantage.

SUMMARY OF THE INVENTION

An adjustable depth controller allows fine tuning adjustment of the gauge wheel support arms for a row unit planter. The depth controller includes an arm pivotally mounted to the row unit, with a handle which can be selectively positioned in one of a plurality of notches to control the position of the gauge wheel arms, and thus the gauge wheels, to adjust the planting depth. The rocker arm is pivotally mounted to the lower end of the depth controller arm via an equalizer block. The equalizer block is pivotally mounted to the controller arms for pivotal movement about a longitudinal horizontal axis. Adjustment bolts engage opposite forward and rearward ends of the equalizer block to allow the block to be pivoted to allow further adjustment of the rocker arm, and thus the gauge wheel arms, for improved control of the planting depth.

DETAILED DESCRIPTION OF THE INVENTION

Figure 1:
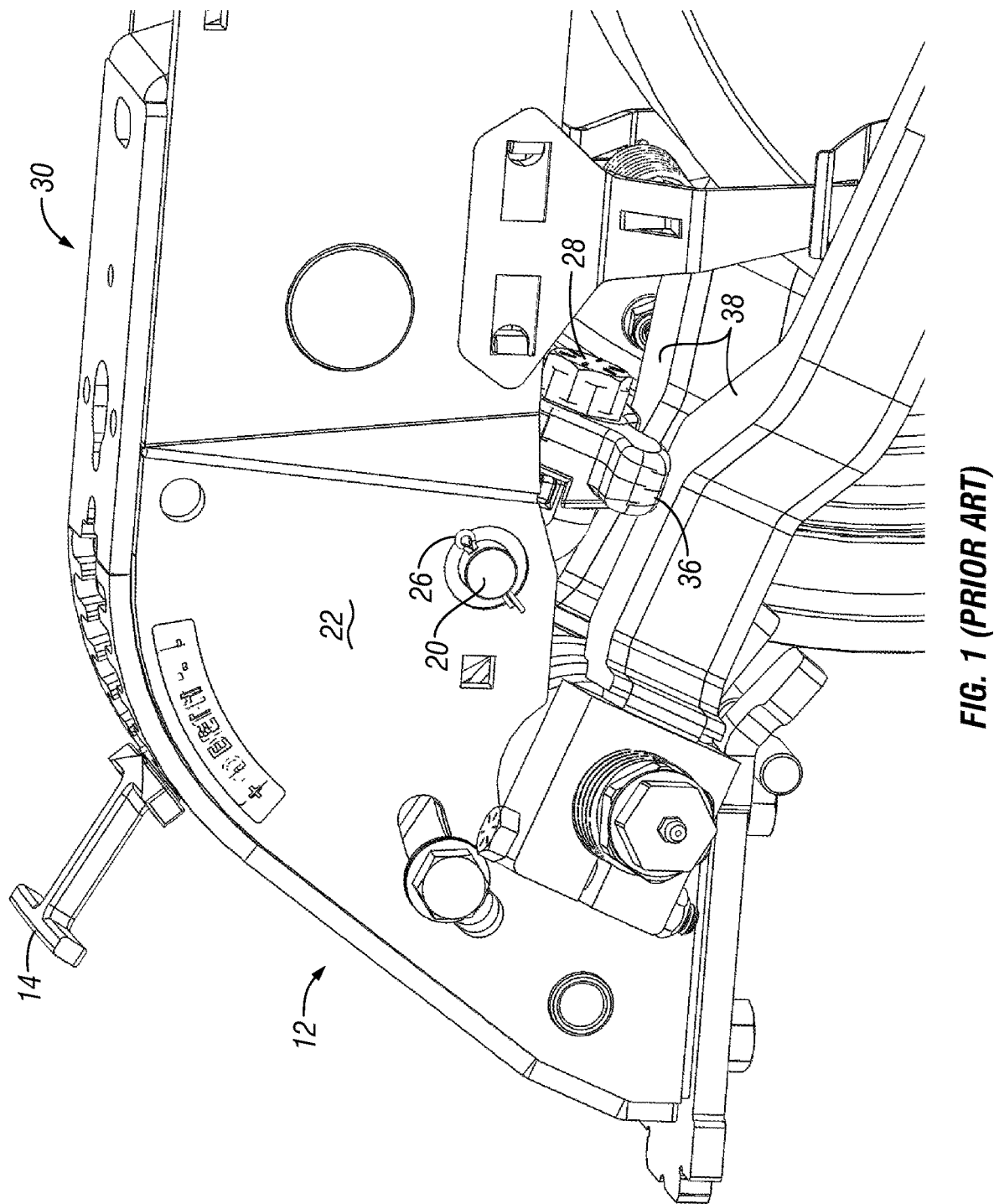
FIG. 1 is a perspective view showing a conventional non-adjustable depth controller for an agricultural row planter.
Figure 2:
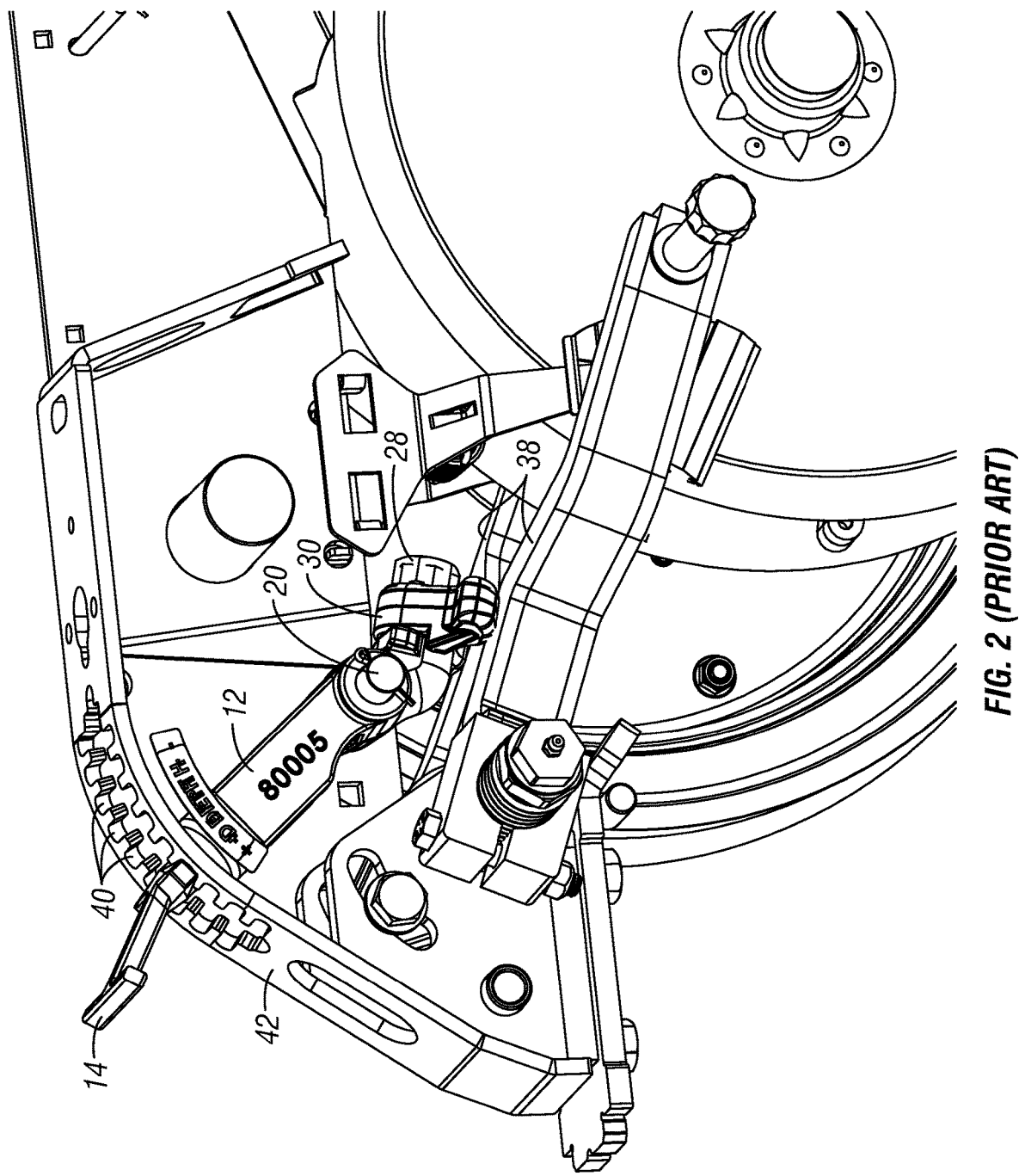
FIG. 2 is another perspective view of the prior art row planter shown in FIG. 1, with the side plate of the frame removed for clarity and illustration of the nonadjustable depth control.
Figure 3:
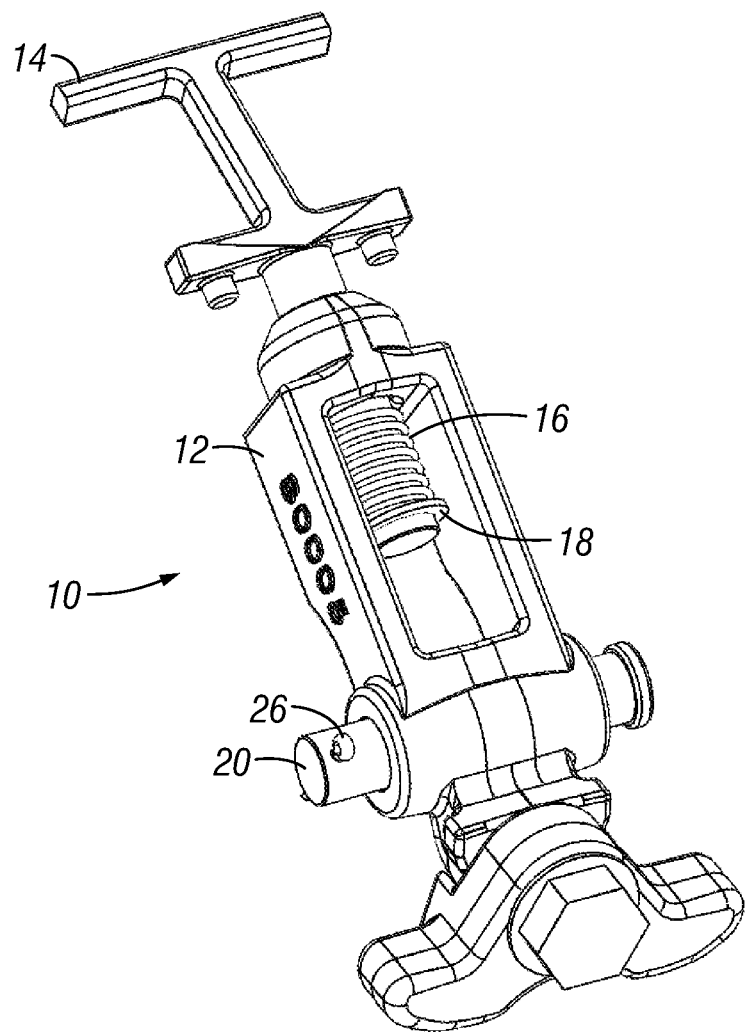
FIG. 3 is a perspective view of the conventional non-adjustable depth control shown in FIG. 2.
Figure 3A:
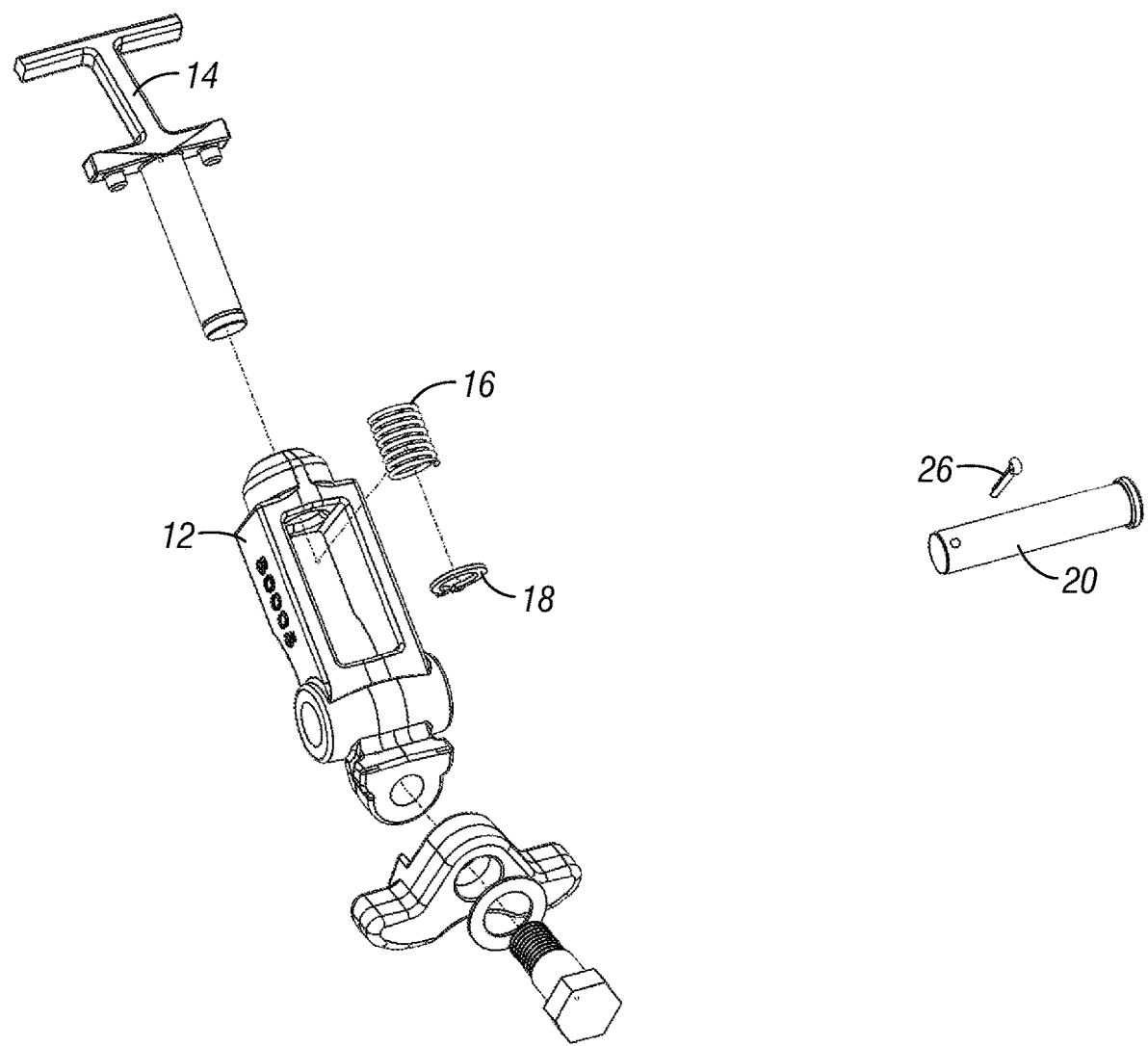
FIG. 3A is an exploded view of the prior art depth controller shown in FIG. 3.
Figure 4:
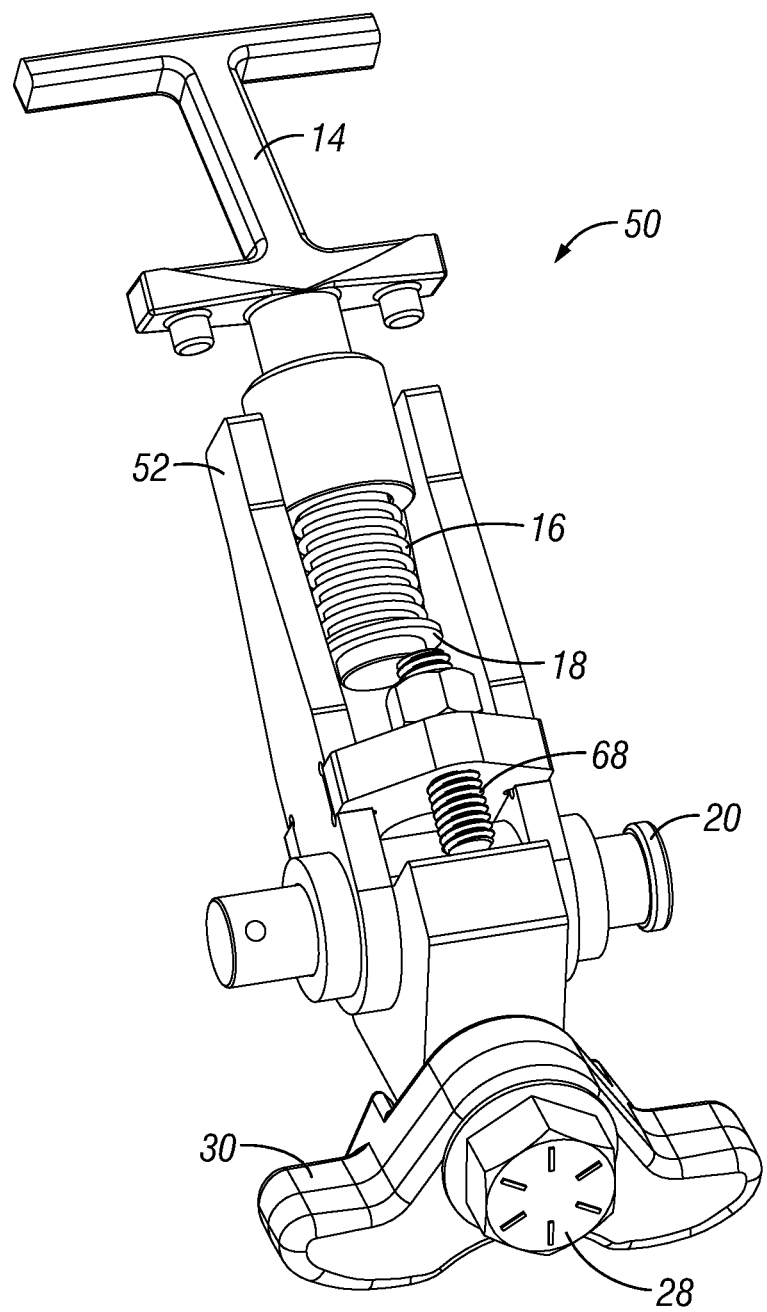
FIG. 4 is a perspective view of the adjustable depth controller for use on a row planter, in accordance with the present invention.
Figure 5:
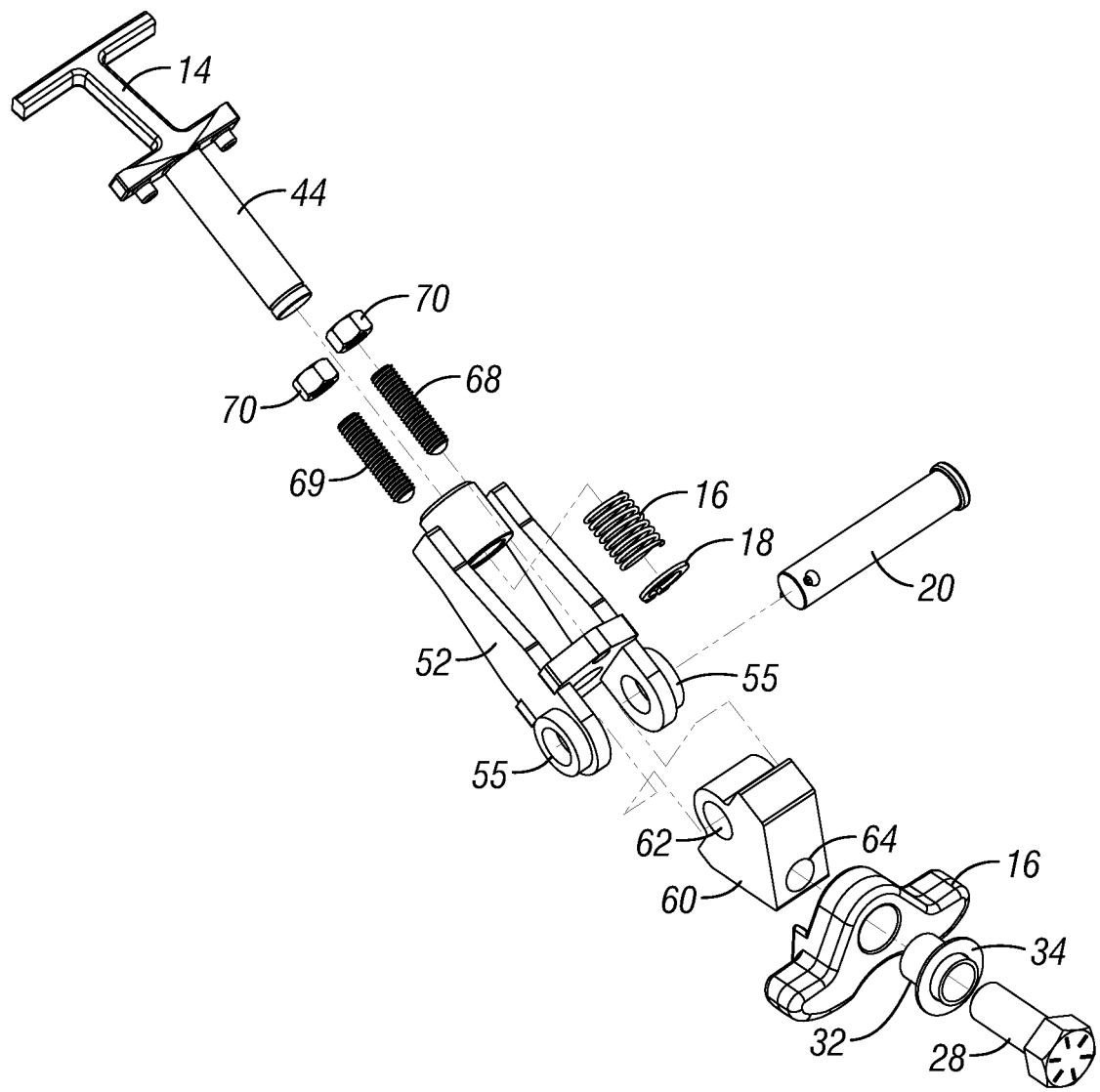
FIG. 5 is an exploded view of the adjustable depth controller of the present invention.
Figure 6:
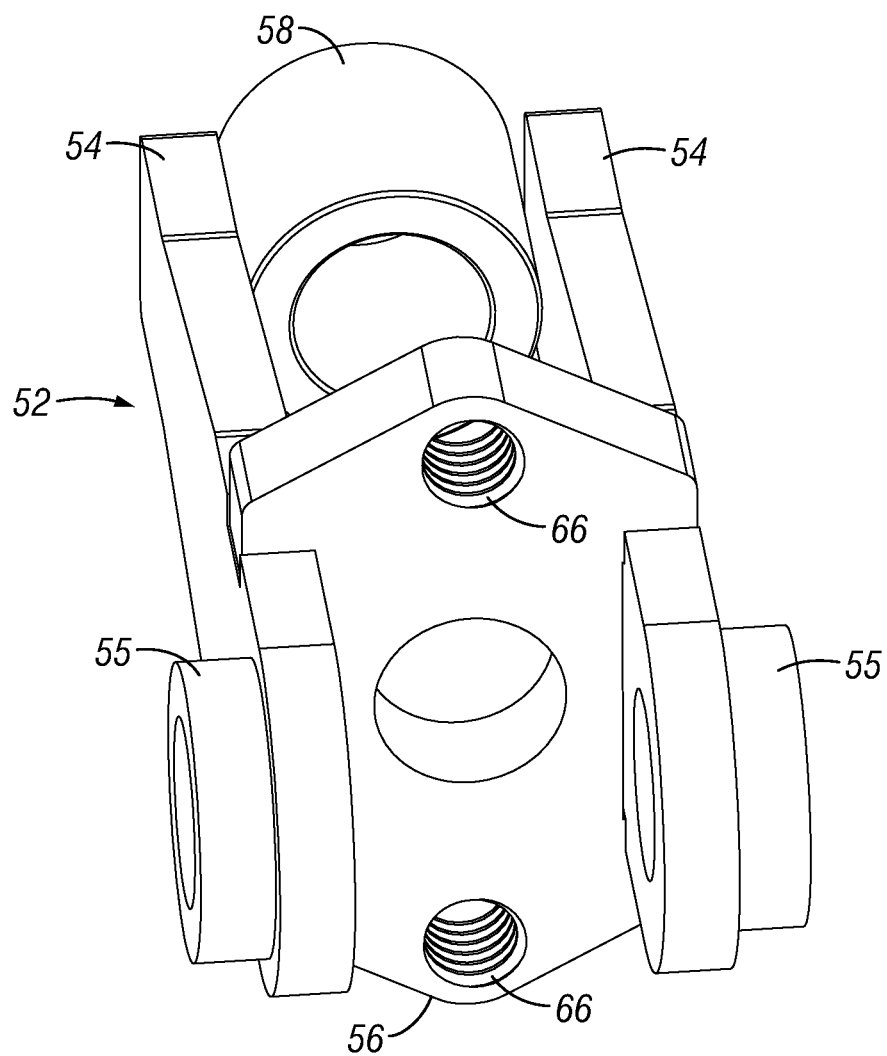
FIG. 6 is a perspective view of the adjustable depth controller arm.

The adjustable depth controller assembly 50 of the present invention is best shown in FIGS. 4-8. The controller 50 includes the same or substantially the same handle 14, spring 16, snap ring 18, pivot pin 20, cotter pin 26, pivot bolt 28, equalizer/rocker arm 30, and shim washer 34 as the non-adjustable controller 10. The adjustable controller 50 includes an arm 52 which has a substantially different construction than the arm 12 of the nonadjustable controller 10. The controller 50 also includes a bushing 32 in the hole of the equalizer arm 30 which minimizes friction as the equalizer arm 30 pivots about the axis of the bolt 28.

The arm 52 includes opposite side plates 54 and a transverse plate 56 fixed between the side plates 54. A hollow tube or collar 58 is welded between the upper ends of the side plates 54. The handle 14 extends through the collar 58 and is retained by the spring 16 and snap ring 18. The lower ends of the side plates 54 have the aligned bushings 55 for receiving the pivot pin 20 for mounting the arm 52 to the side plates 22 of the row planter, similar to the nonadjustable controller 10.

A mounting block 60 extends between the bushings 55 of the side plates 54 and includes a hole 62 for receiving the pin 20, such that the block 60 is pivotal about the axis of the pin 20. The rocker arm 30 is mounted to the block 60 via the bolt 28 which is threadably received in a hole 64 in the forward face of the block 60. The bushing 32 and shim washer 34 are used with the bolt 28.

The transverse plate 56 includes a pair of threaded holes 66, each of which are adapted to receive an adjustment bolt 68, 69. The adjustment bolts 68, 69 can be threaded up and down in the holes 66, typically in opposite directions, and then set or held in place by jam nuts 70.

Figure 14:
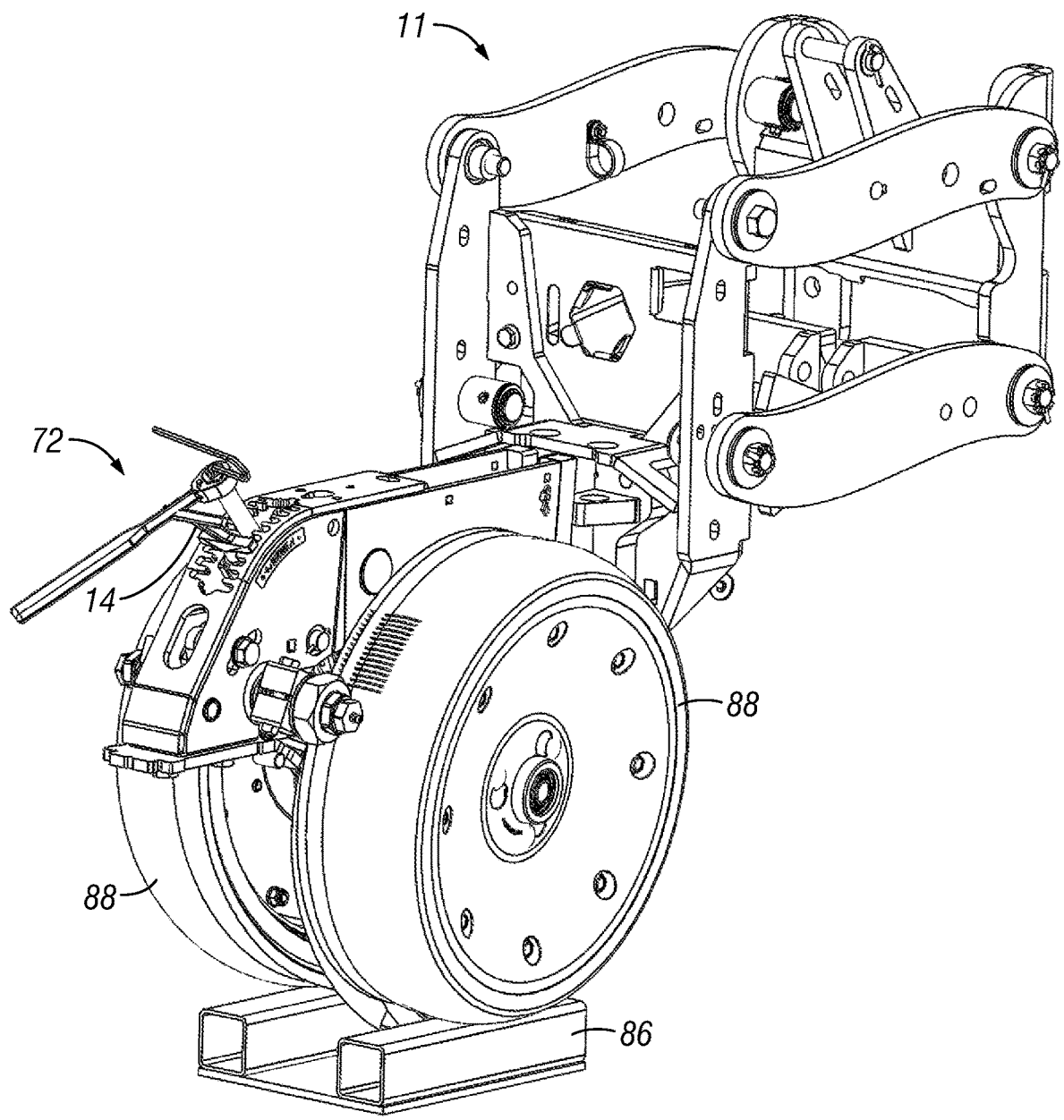
FIG. 14 is a perspective view of a row planter unit having the adjustable depth controller of the present invention, with a tool shown for adjusting the depth controller.
Figure 15:
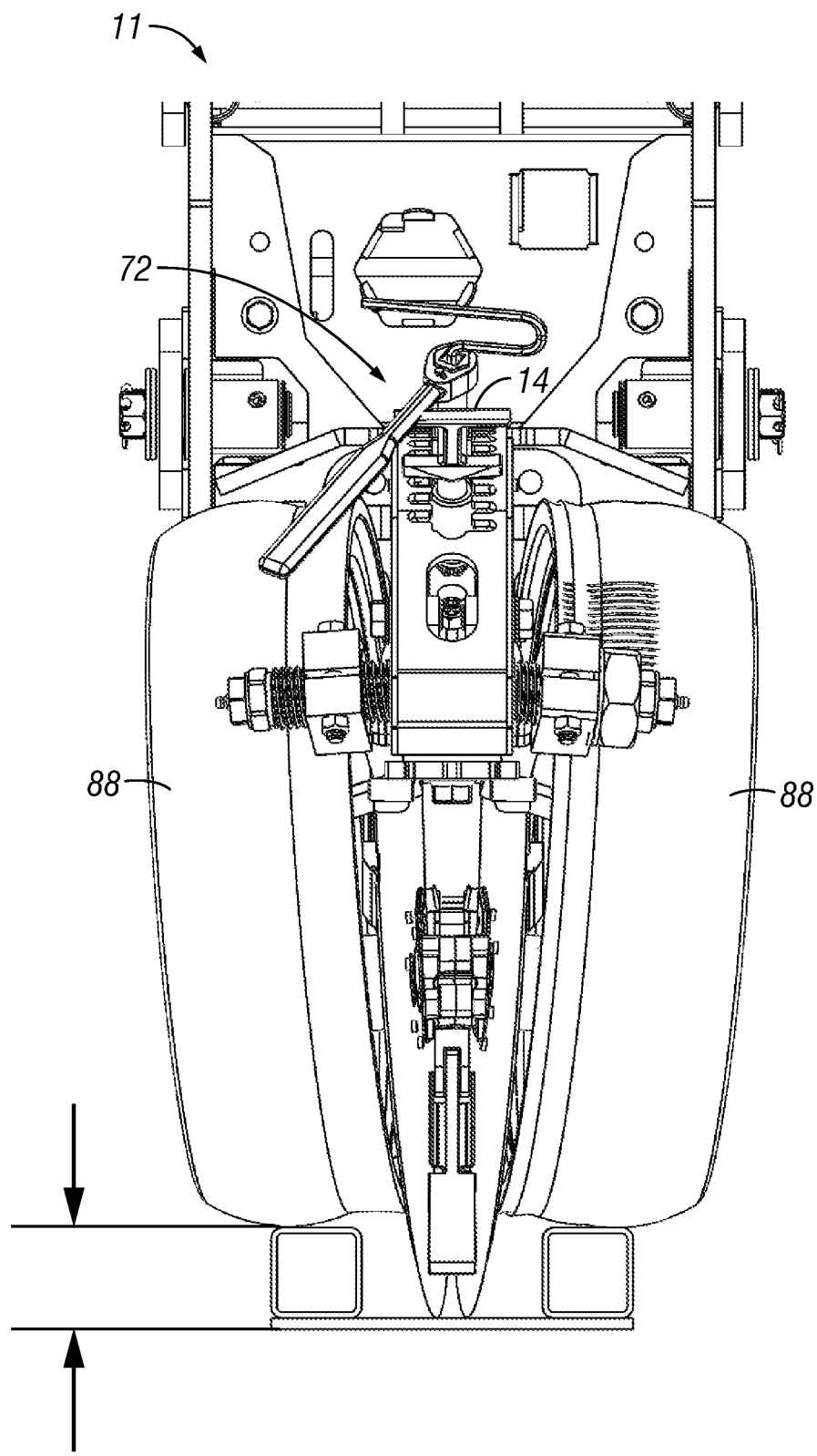
FIG. 15 is a rear view of the row planter shown in FIG. 14.
Figure 16:
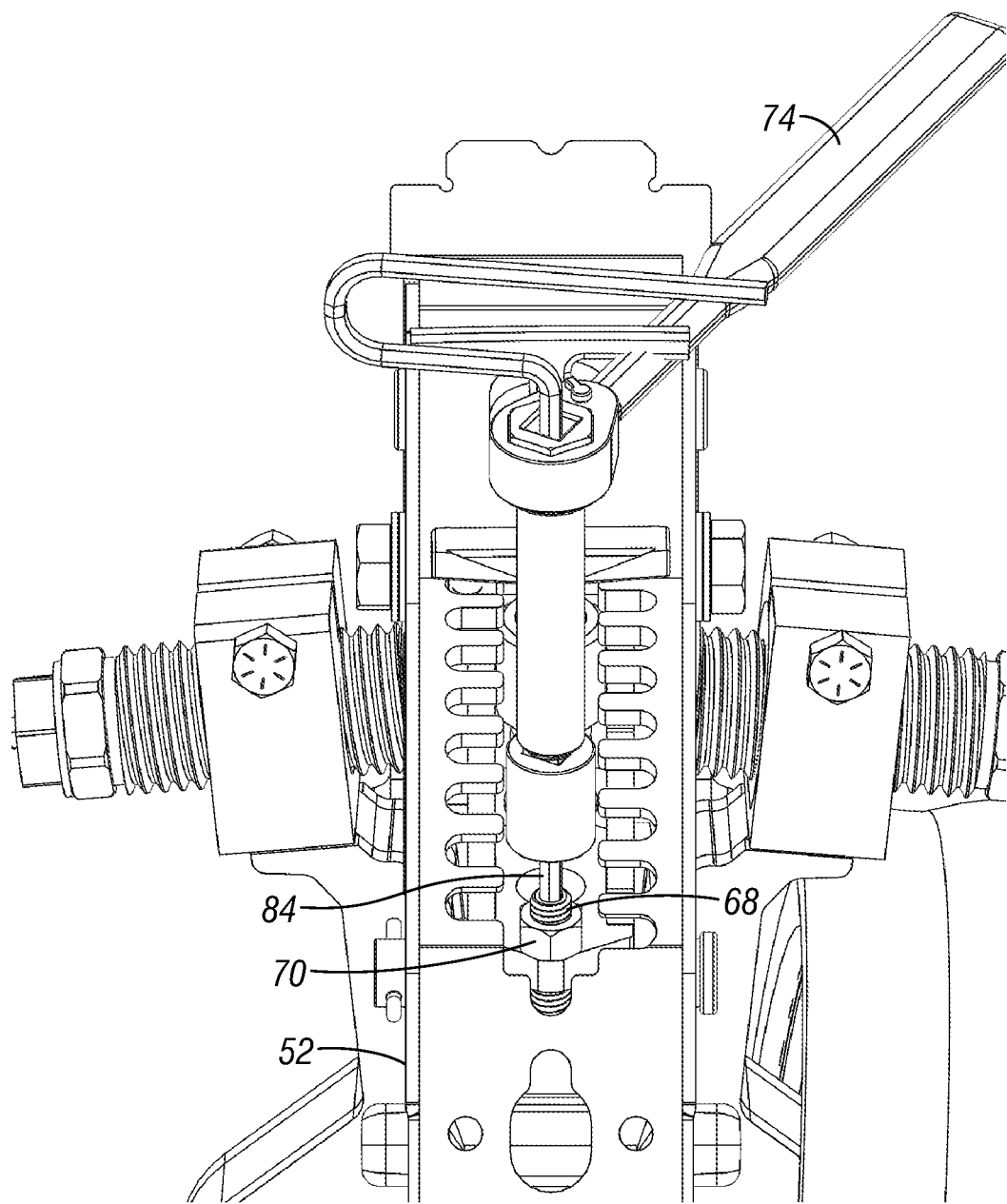
FIG. 16 is top view of the planter and tool shown in FIG. 14.
Figure 17:
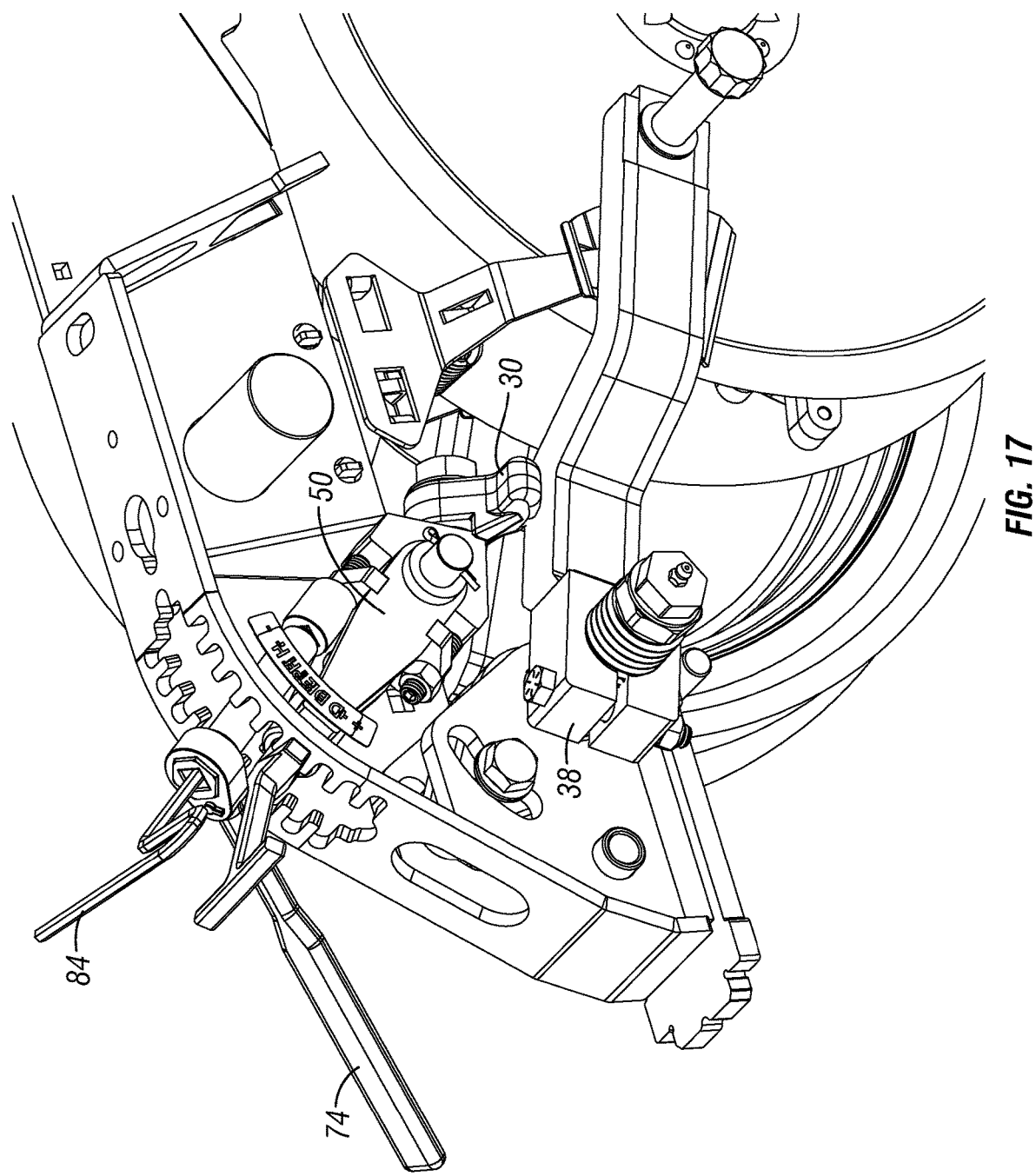
FIG. 17 is a perspective view of the row unit, with the side plate removed from the row planter frame to expose the adjustable depth controller and tool.
Figure 18:
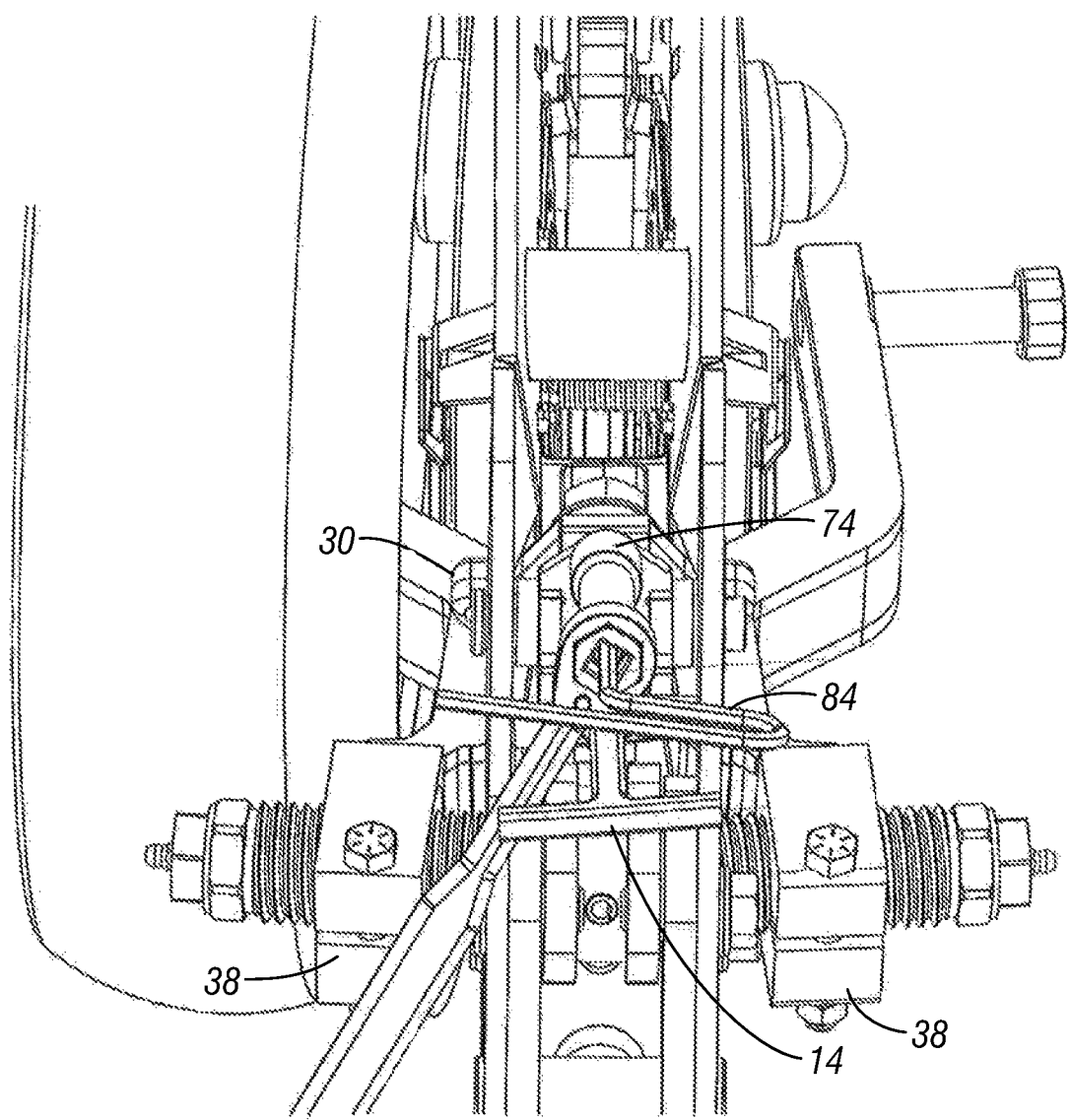
FIG. 18 is a rear view of the row unit with the notch plate of the row planter removed to expose the adjustable depth controller.
Figure 19:
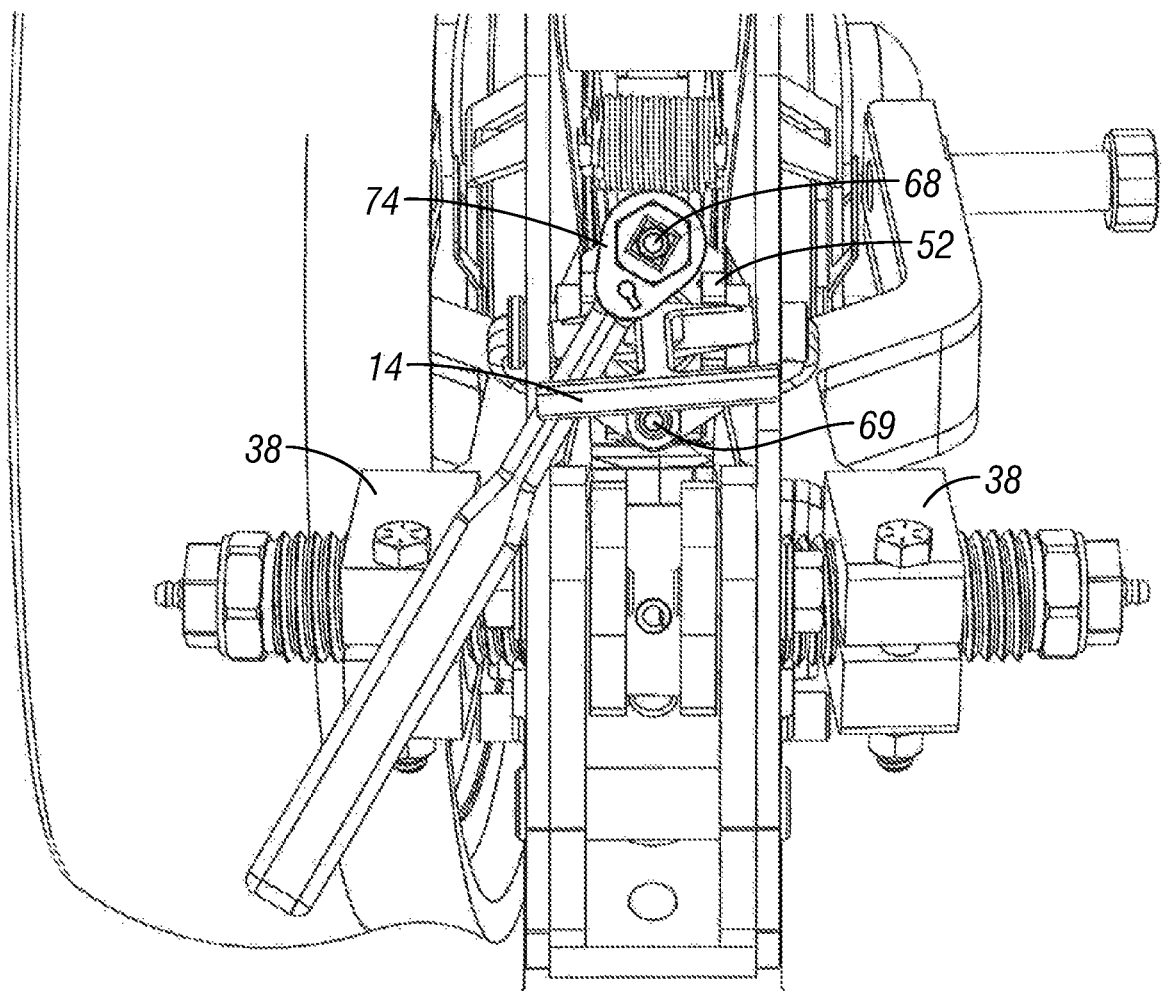
FIG. 19 is another upper view of the row unit and adjustment tool, with the notch plate removed and with the Allen wrench removed for clarity.
Figure 20:
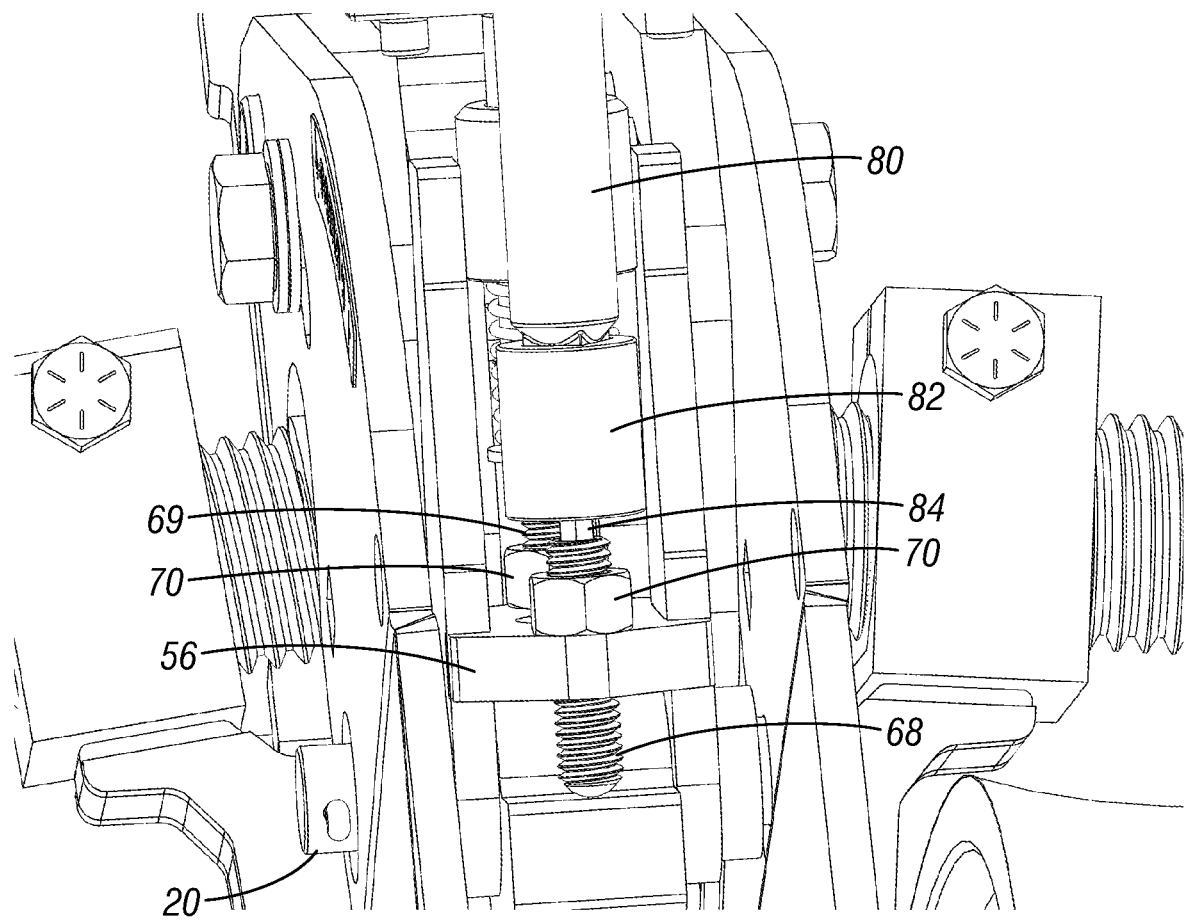
FIG. 20 is an enlarged perspective view showing the socket raised from the jam nut and the Allen wrench inserted into one of the adjustment bolts.
Figure 21:
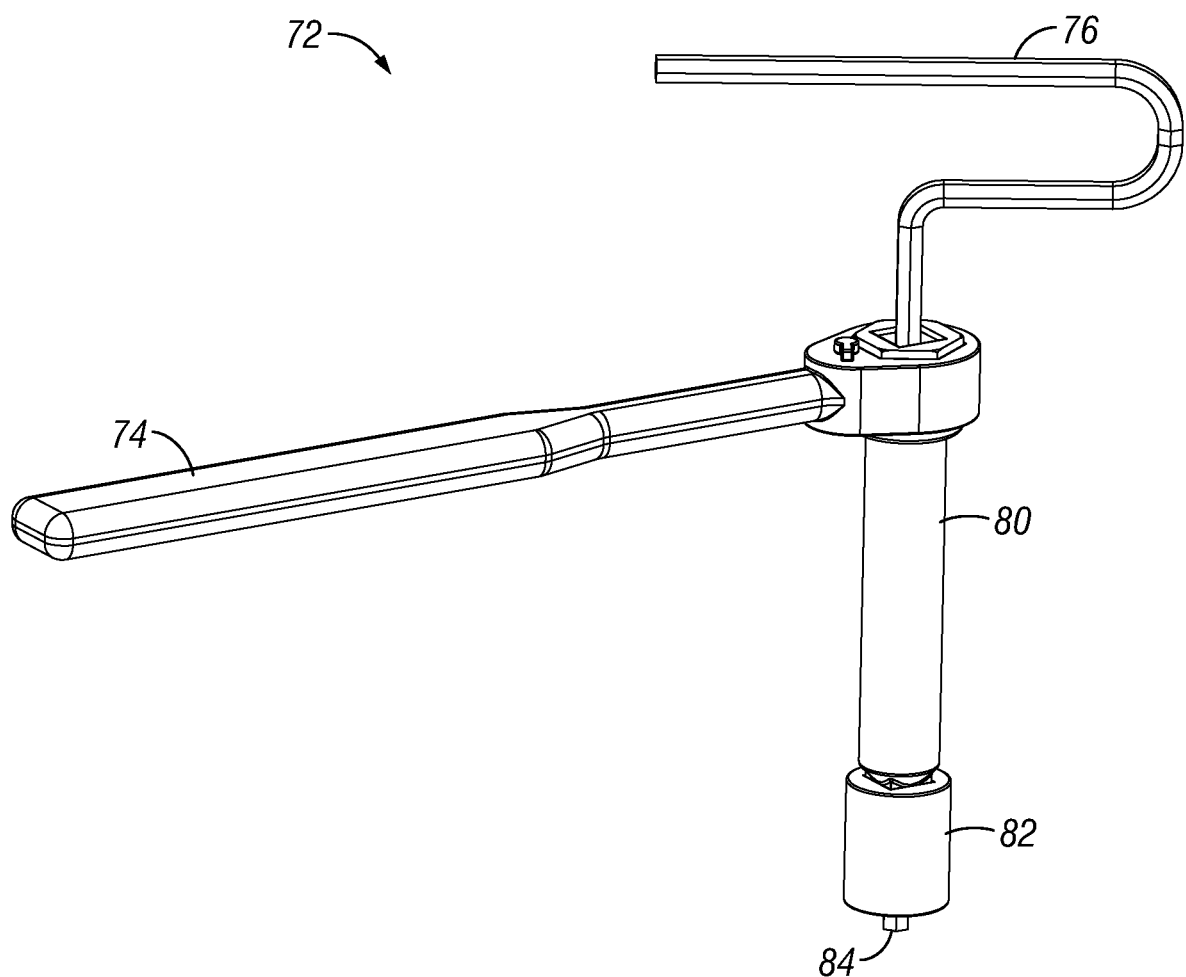
FIG. 21 is perspective view of the socket and Allen wrench adjustment tool used in adjusting the depth controller of the present invention.
Figure 22:
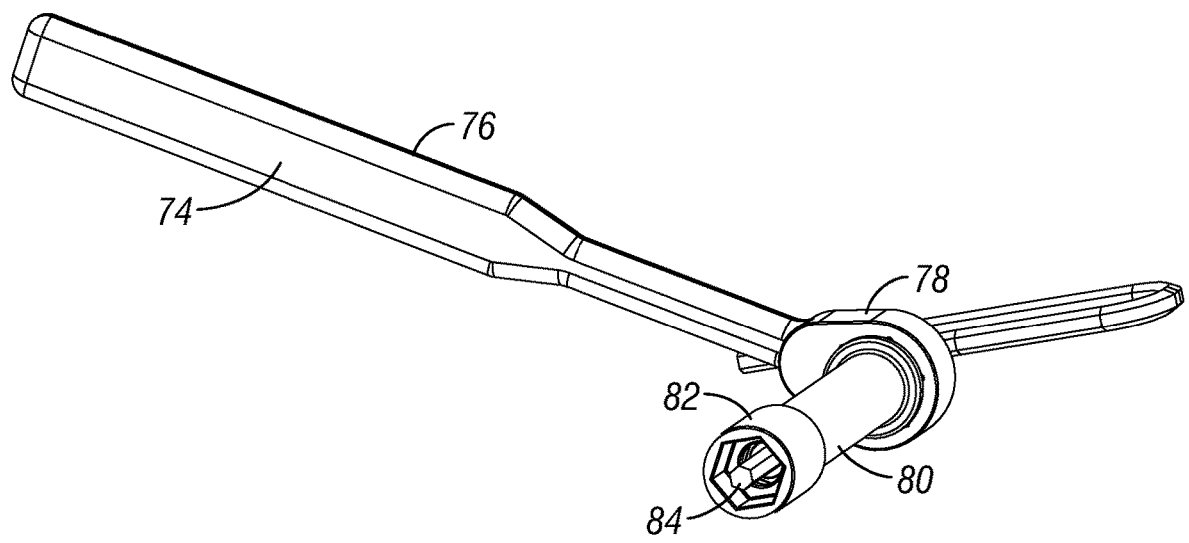
FIG. 22 is another perspective view of the socket and Allen wrench adjustment tool.

The adjustment of the bolts 68, 69 is accomplished with a tool 72, shown in FIGS. 14-22. In the preferred embodiment, the tool is a combination socket and Allen wrench. More particularly, as best seen in FIG. 21, the tool 72 includes a wrench 74 with a handle 76 and a ratcheting head 78. A pass-through socket extension 80 is mounted on the head 78, with a pass-through socket 82 on the lower end of the extension 80. A hex drive Allen wrench extends through the head 78, the extension 80, and the socket 82. The tool 72 is adapted to fit through the notch plate 42 of the row unit, such that the socket 82 can turn the jam nuts 70. When the jam nuts 70 is loose, the Allen wrench 84 can be extended to engage an upper hex recess in the top of the adjustment bolt 68, 69, as shown in FIGS. 16 and 20.

Figure 7:
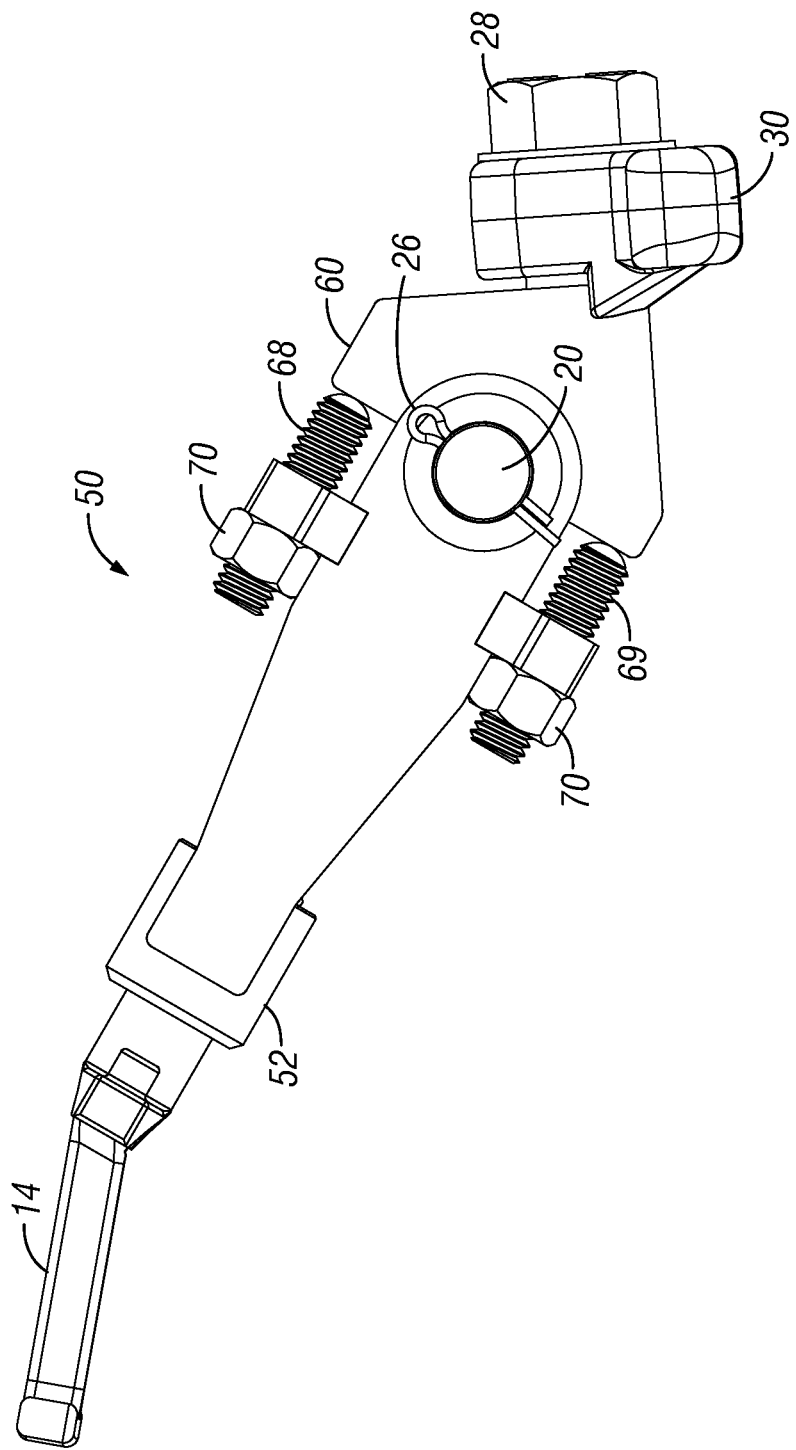
FIG. 7 is a side elevation view of the adjustable depth controller in a neutral position.
Figure 8:
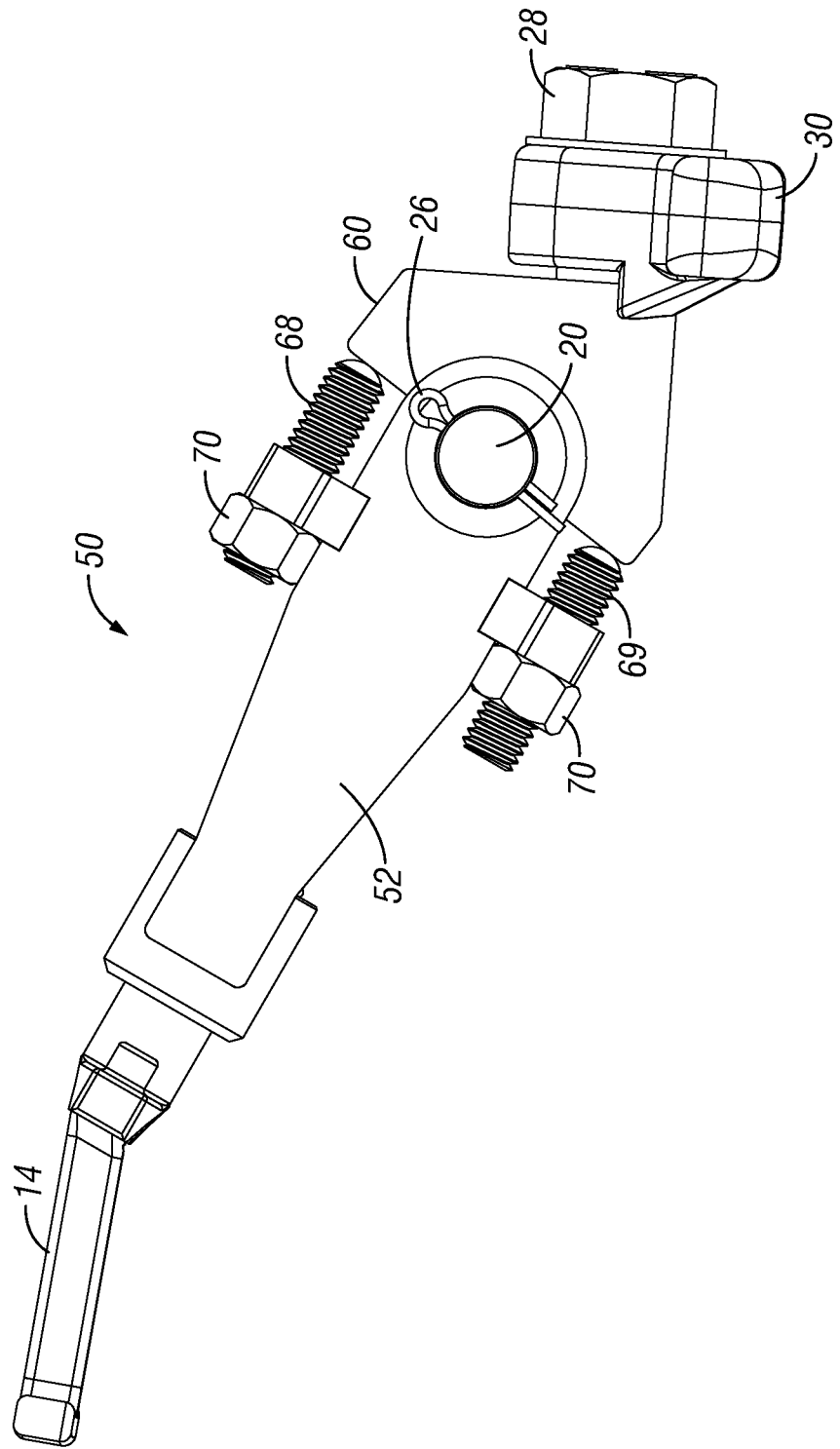
FIG. 8 is a side elevation view of the adjustable depth controller in an adjusted or pivoted position.
Figure 9:
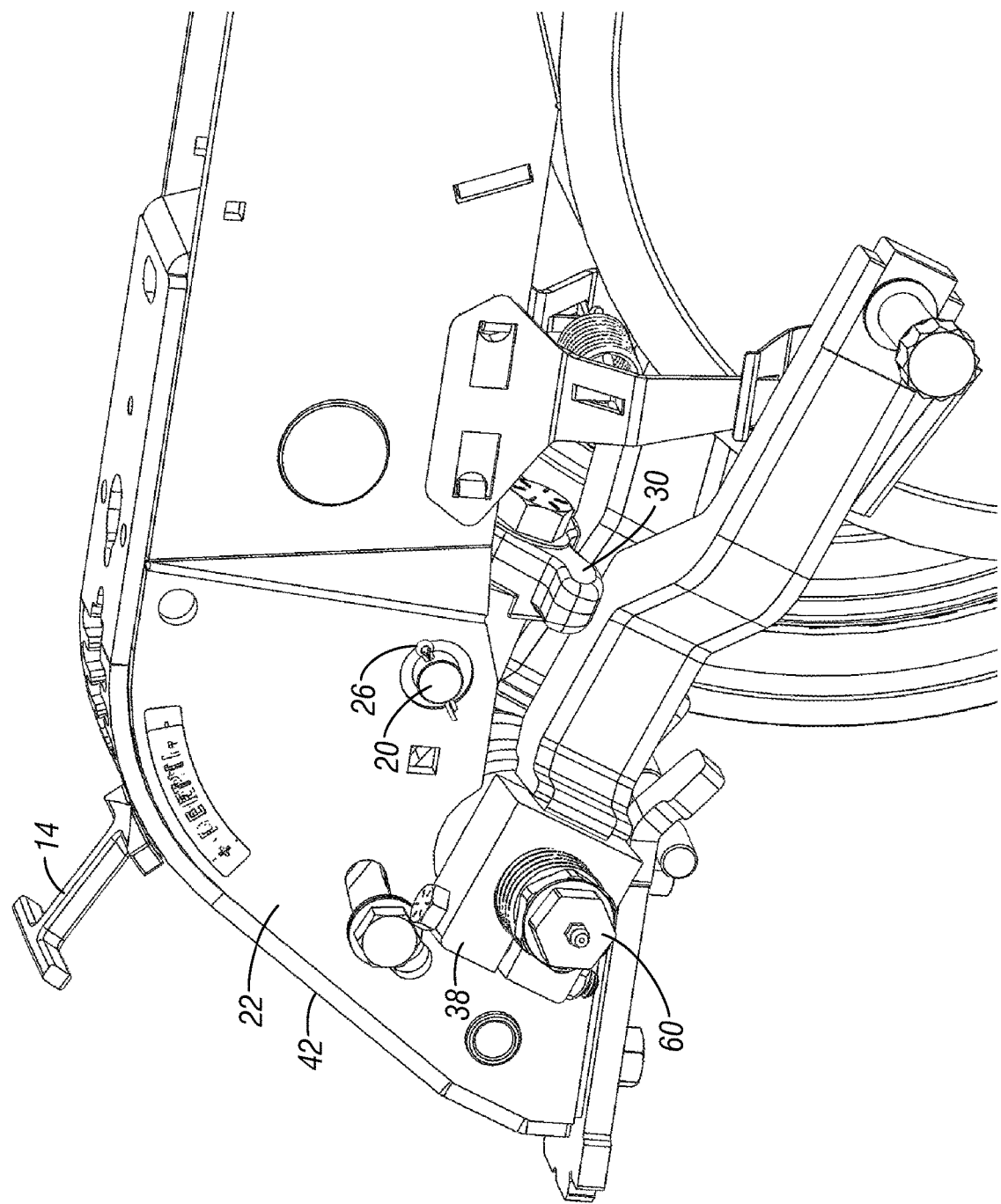
FIG. 9 is a perspective view of the row planter with the adjustable depth controller of the present invention.
Figure 10:
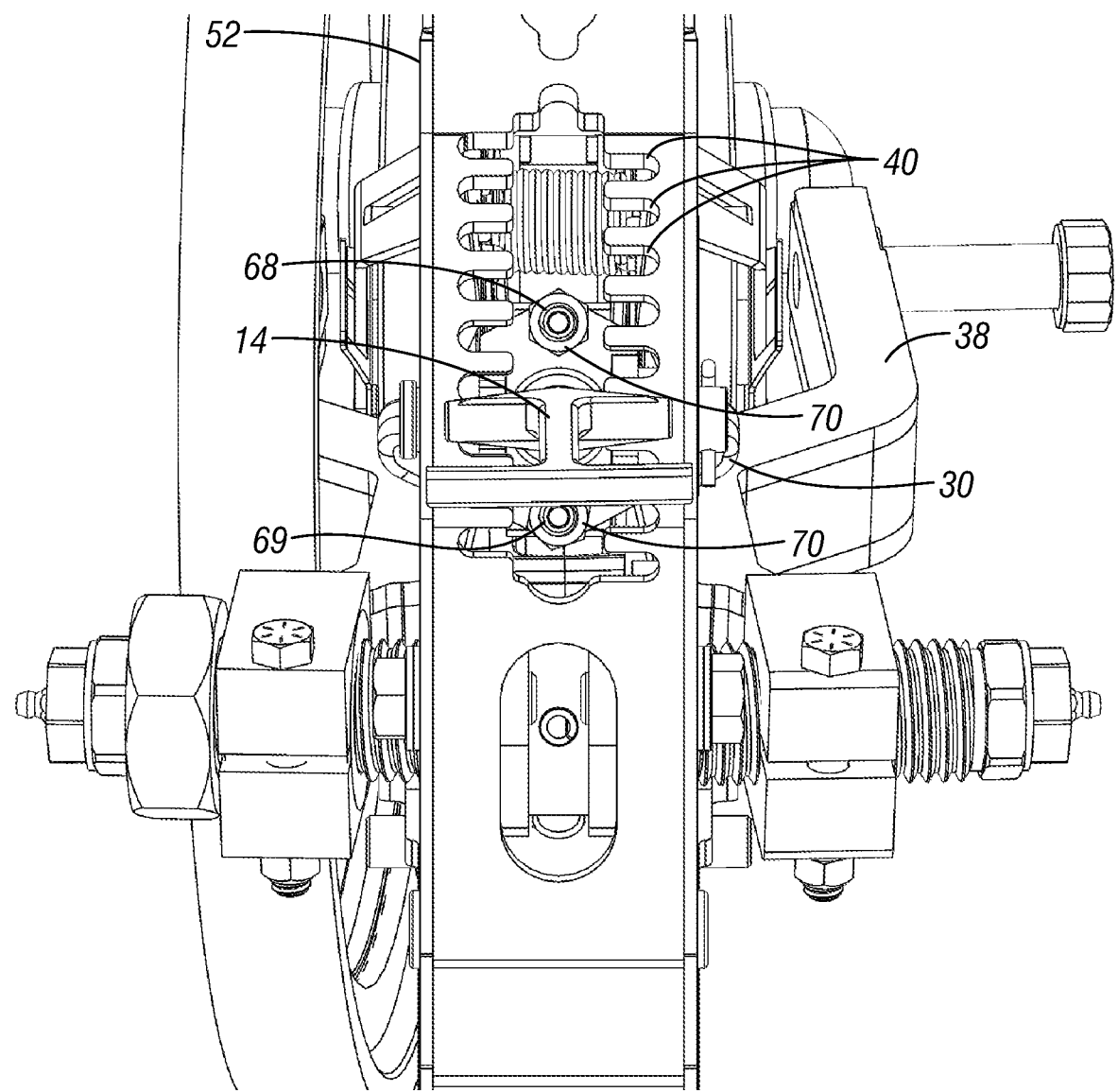
FIG. 10 is a top plan view of a portion of the planter unit shown in FIG. 9.
Figure 11:
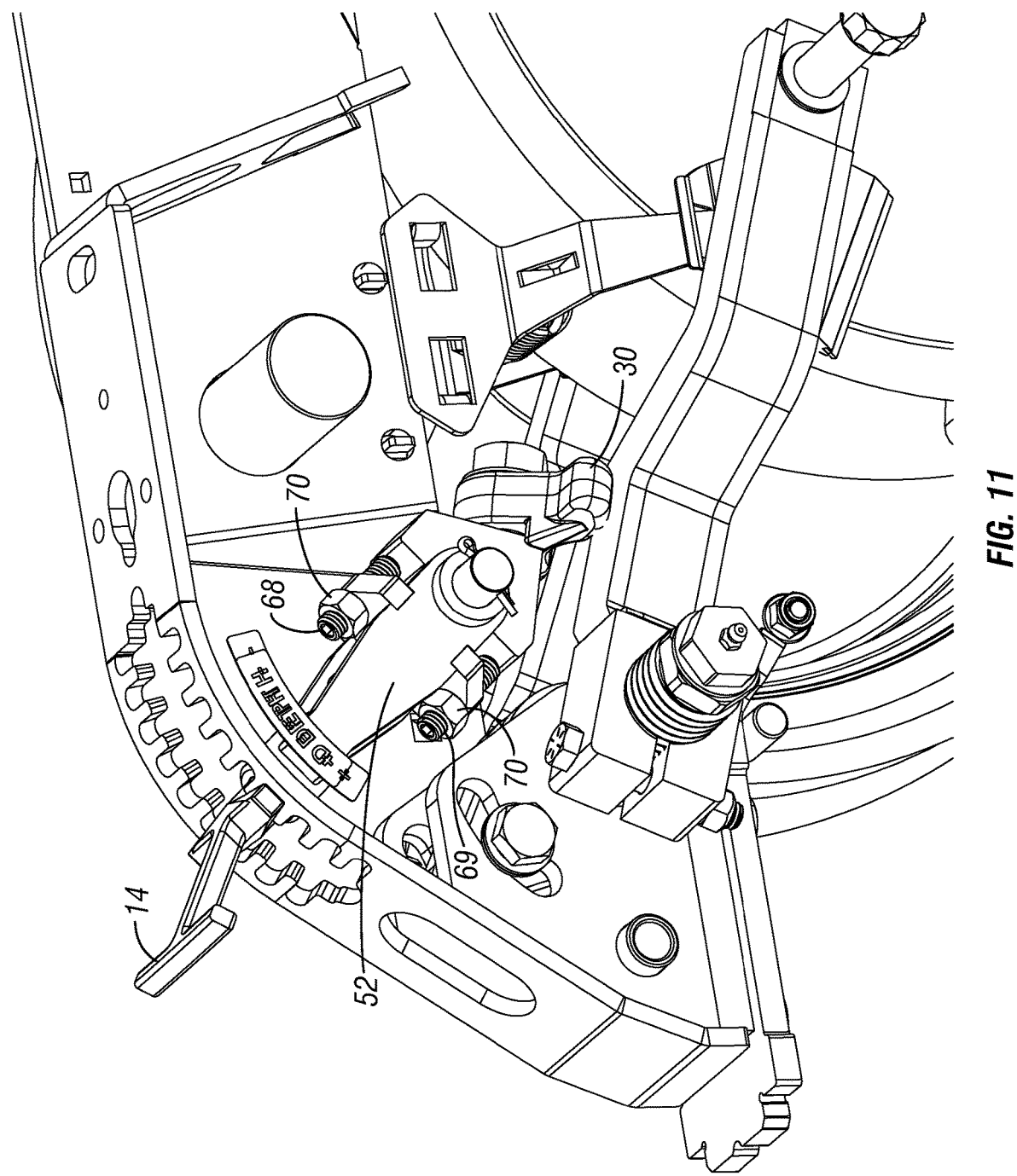
FIG. 11 is another perspective view of the planter unit of FIG. 9, with the side plate removed for clarity, and with the adjustable controller in a neutral position.
Figure 12:
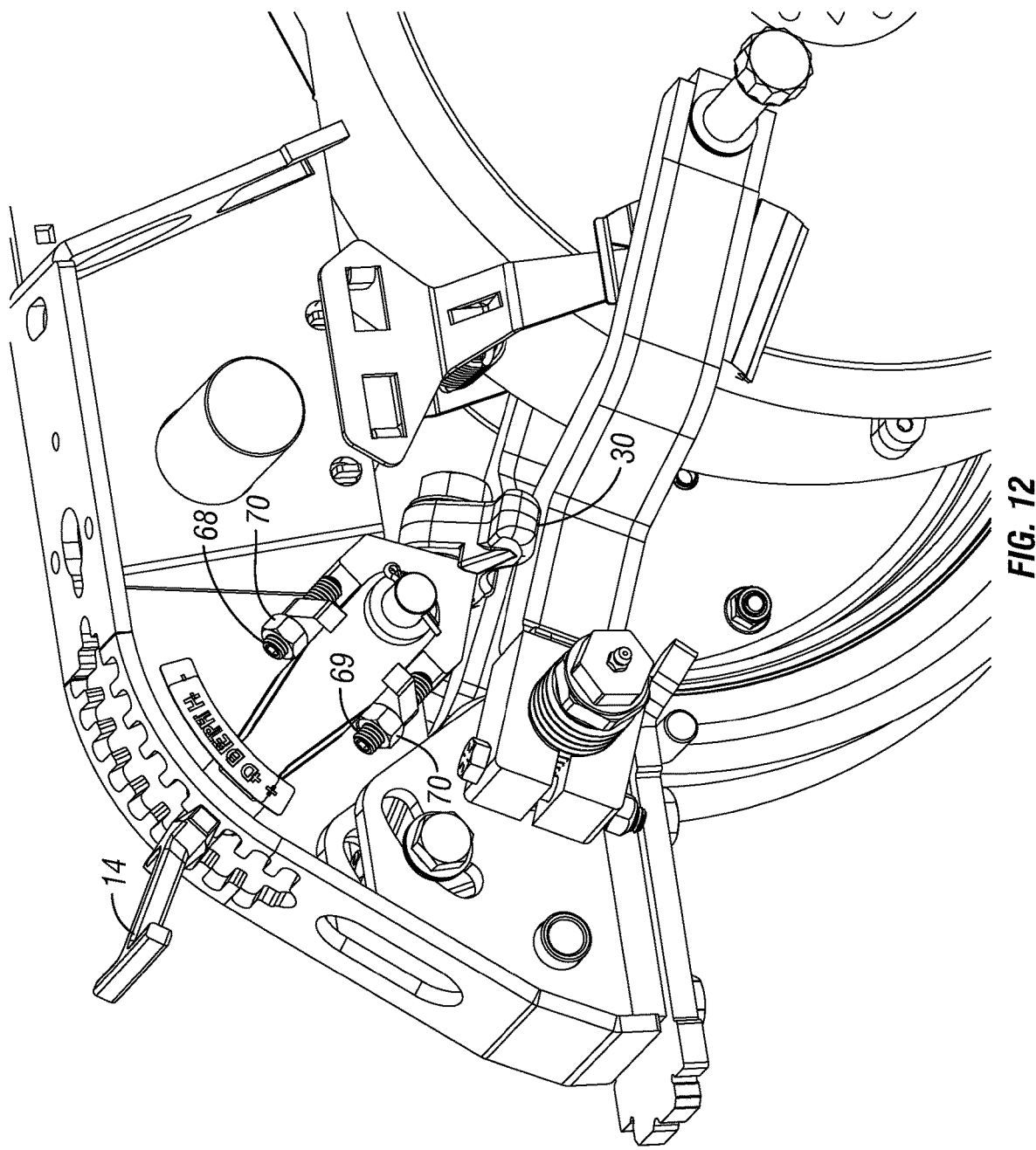
FIG. 12 is a view similar to FIG. 11 with the adjustable controller in an adjusted position.
Figure 13:
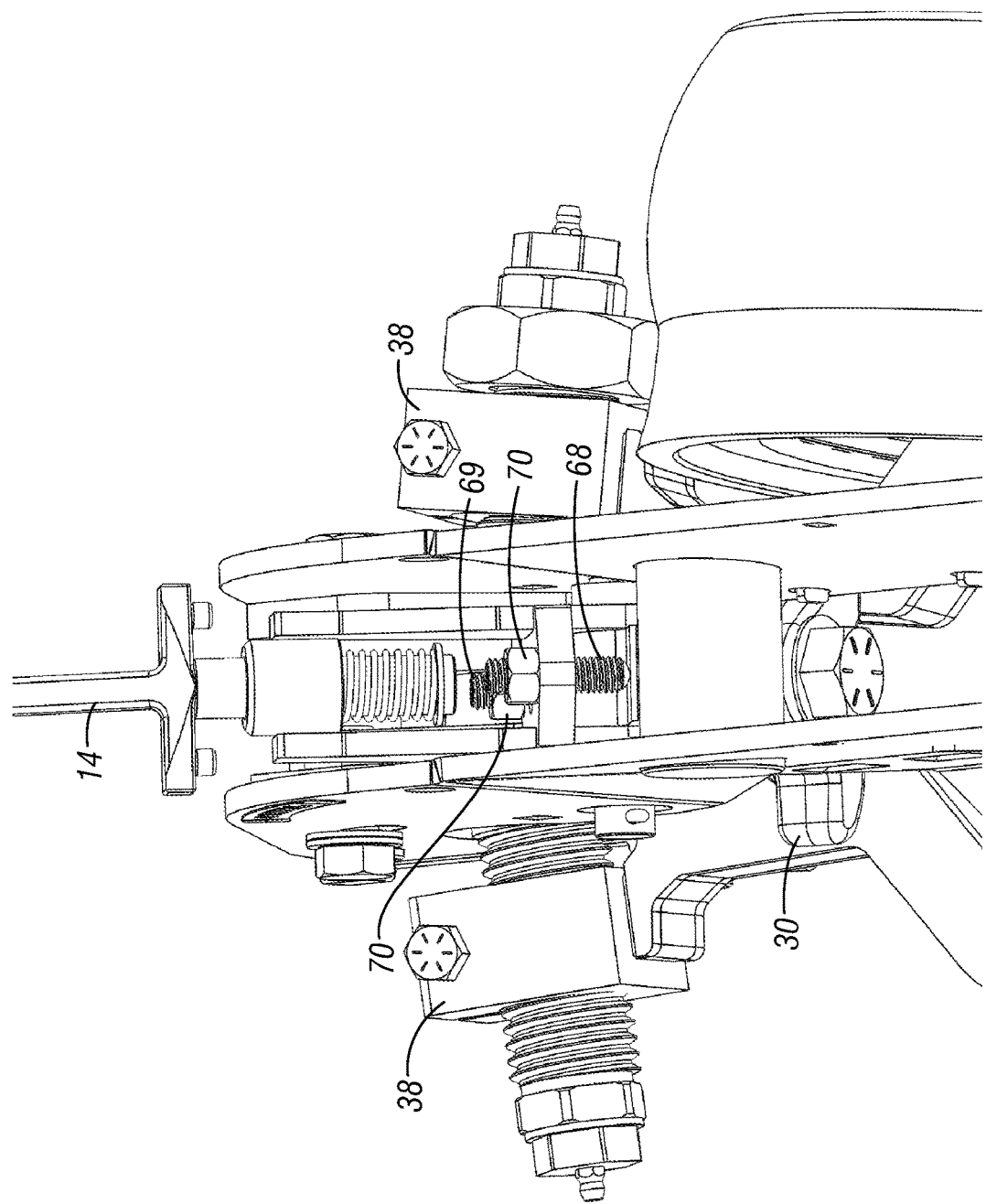
FIG. 13 is a front elevation view of the planter unit shown in FIG. 9, with the notch plate removed to show the adjustable depth controller of the present invention.

Initially, when there is no wear or tolerance variations on the rocker arm 30, the controller 50 can be set with the block 60 in a neutral position, with the adjustment bolts 68, 69 extended equally through the transverse plate 56, as shown in FIGS. 7 and 11. When either of the gauge wheel arms 38 need to be adjusted to maintain accurate planting depth, the controller 50 can be adjusted by loosening the jam nuts 70, extending or retracting the upper adjustment bolt 68 and retracting or extending the lower adjustment bolt 69 so that the block 60 pivots downwardly or upwardly, respectively, about the axis of the pin 20, thereby adjusting the rocker arm 30 to accommodate wear or manufacturing variance. Then the jam nuts 70 are tightened to hold the block 60 and rocker arm 30 in the desired position. The controller arms 52 also pivot about the transverse, horizontal axis of pin 20. Thus, the block 60 and rocker arm 30 can pivot with the controller arms 52 via movement of the handle 14, or independently of the arms 52 via adjustment of the bolts 68, 69.

FIGS. 14 and 15 show a calibration tool or device 86 which can be used to set the planting depth of the gauge wheels 88. The calibration tool 86 has a known thickness or height to allow the operator to set the planning depth of the gauge wheels 88 for each row unit assembly 11.

The depth control system of the present invention uses an adjustable "notch and lever" design that allows all of the row units on the planter to be set at the same depth control notch and then all row units calibrated to a known planting depth of the row unit versus a non-adjustable "notch and lever" design. With the adjustable system, the calibration guide 86 is placed under each planter row unit gauge wheel 88 and the seed disc or shoe openers. This calibration guide will then be raised so it just touches the bottom of the seed disc opener or shoe, which will move the row unit gauge wheels up to the desired calibration height from the bottom of the opener. The desired depth control notch 40 in the row unit will then be determined and the depth control handle 14 will try to be placed in the desired notch. If the handle 14 cannot be placed in the desired notch and apply a slight amount of force against the gauge wheel arm 38, the depth control arm 12 must be adjusted.

To adjust the control arm 12, the jam nuts on the arm assembly must be loosened, using the pass-thru ratchet wrench, extension and socket. Once the jam nuts 70 are loosened, the socket head adjustment bolt 68, 69 can tightened or loosened so the depth control handle 14 can be positioned in the correct notch 40 in the row unit frame and so a slight pressure is applied against the row unit gauge wheel arm 38. The jam nuts can then be tightened by placing the Allen wrench hex drive wrench through the pass-through ratchet wrench, extension and socket, to hold the adjusting nut in position.

Figure 23:
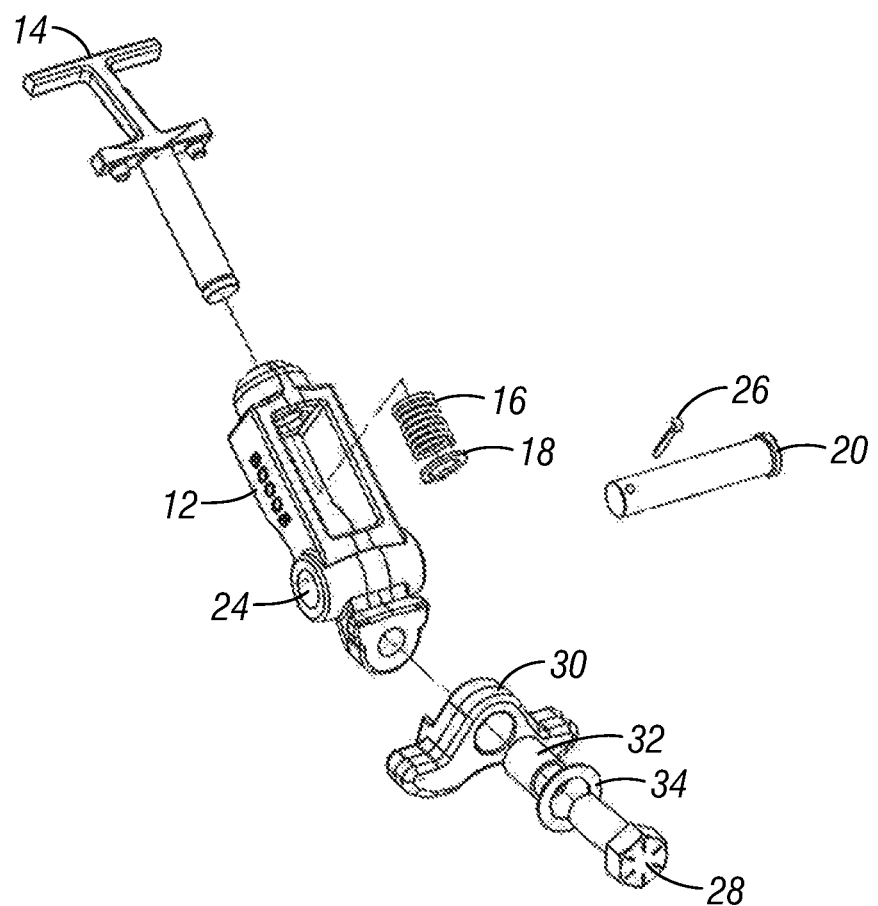
FIG. 23 is an exploded view showing a wear bushing used on a non-adjustable depth controller.

FIG. 23 shows the additional low cost bushing 32 used on the non-adjustable controller 10. The bushing in the rocker/equalizer arm 30 allows the retention bolt 28 to be a lower cost, standard grade 8 shoulder bolt, such that the repair cost of maintaining depth control system is reduced. The lower cost bushing 32 installed between the rocker/equalizer arm 30 and the pivot/rocker pivot retain bolt 28, is softer than the case hardened rocker/equalizer arm and will be the wear/replacement part of the conventional depth control system 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. An adjustable depth controller for an agricultural row unit having gauge wheels mounted on gauge wheel arms pivotally mounted on a frame having a plurality of adjustment notches, the depth controller comprising:
   a control arm pivotally mounted on the frame;
   a control handle extending from an upper end of the control arm for selective receipt in the adjustment notches;
   a block pivotally mounted to a lower end of the control arm;
   a rocker arm mounted to the block and having opposite lateral sides engaging the gauge wheel arms;
   adjustment bolts threadably extending through the control arm to engage the block; and
   whereby screwing the adjustment bolts in and out pivots the block to move the rocker arm so as to adjust the gauge wheel arms to provide a desired planting depth.

2. The adjustable depth controller of claim 1 wherein the block pivots about a transverse horizontal pivot axis.

3. The adjustable depth controller of claim 2 wherein the bolts extend perpendicular to the pivot axis.

4. The adjustable depth controller of claim 2 wherein the rocker arm pivots about a pivot axis perpendicular to the transverse horizontal pivot axis.

5. The adjustable depth controller of claim 1 wherein the control arm includes spaced apart side plates and a bolt plate extending between the side plates, and the adjustment bolts extend through the bolt plate.

6. The adjustable depth controller of claim 5 wherein the bolts are on opposite front and rear ends of the bolt plate.

7. The adjustable depth controller of claim 1 wherein the block pivots longitudinally.

8. The adjustable depth controller of claim 1 further comprising a rocker bolt extending through a bushing in the rocker arm and threadably received in the block.

9. The adjustable depth controller of claim 1 further comprising jam nuts on the bolts to lock the bolts in an adjusted position.

10. The adjustable depth controller of claim 1 wherein the handle is spring biased.

11. A depth control assembly for adjusting planting depth on a row unit having left and right gauge wheels on left and right gauge arms, the control assembly comprising:
    a control arm pivotally mounted to the row unit;

a handle selectively positionable in one of a plurality of slots on the row unit to selectively position the control arm;

an equalizer block pivotally mounted to the control arm and operatively engaging the gauge wheel arms; and threaded adjustment bolts on opposite ends of the equalizer block to set a pivotal position of the equalizer block and thereby adjust the gauge wheels.

12. The depth control assembly of claim 11 wherein the equalizer block has a pivot axis extending transverse to the bolts.

13. The depth control assembly of claim 11 further comprising jam nuts on the bolts.

14. The depth control assembly of claim 11 wherein the bolts have recessed hex heads for receiving an Allen wrench.

15. The depth control assembly of claim 11 wherein the control arm has opposite upper and lower ends, with the handle being accessible at the upper end and the equalizer block being adjacent the lower end, and a plate between the upper and lower ends, with the adjustment bolts extending through the plate to engage the equalizer block.

16. A depth control assembly for adjusting planting depth on a row unit having left and right gauge wheels on left and right gauge arms, the control assembly comprising:

a control arm pivotally mounted to the row unit;

a handle to selectively position the control arm;

an equalizer block pivotally mounted to the control arm and operatively engaging the gauge wheel arms;

threaded adjustment bolts on opposite ends of the equalizer block to set a pivotal position of the equalizer block and thereby adjust the gauge wheels; and a rocker arm mounted to the equalizer block and having opposite left and right ends engaging the left and right gauge wheel arms, respectively.

17. The depth control assembly of claim 16 wherein the rocker arm pivots about an axis perpendicular to a pivot axis of the equalizer block.

18. The depth control assembly of claim 16 wherein the equalizer block pivots longitudinally, and the rocker arm pivots laterally.

19. The depth control assembly of claim 16 wherein the control arm is bolted to the equalizer block.

\* \* \* \* \*